(12) United States Patent
Kim et al.

(10) Patent No.: US 6,449,229 B1
(45) Date of Patent: Sep. 10, 2002

(54) OPTICAL PICKUP ASSEMBLY WITH ADJUSTABLE INCLINATION

(75) Inventors: Seok-Jung Kim; Byung-Ryul Ryoo; Yong-Ki Son, all of Suwon; Pyong-Yong Seong, Seoul; Yong-Jae Lee; Tae-Kyung Kim, both of Suwon; Jang-Hoon Yoo, Seoul, all of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/328,375

(22) Filed: Jun. 9, 1999

(30) Foreign Application Priority Data

Jun. 9, 1998 (KR) ........................................ 1998-21324

(51) Int. Cl.$^7$ ................................................ G11B 7/00
(52) U.S. Cl. ................................ 369/53.19; 369/44.32; 369/44.14; 359/814
(58) Field of Search .......................... 369/44.16, 44.14, 369/44.22, 44.32, 53.19, 44.15, 53.28, 244; 359/824, 814, 813, 819, 822, 823

(56) References Cited

U.S. PATENT DOCUMENTS

| | | | | |
|---|---|---|---|---|
| 5,430,699 A | * | 7/1995 | Matsubara et al. | 369/44.32 |
| 5,777,972 A | * | 7/1998 | Furusawa | 369/112 |
| 5,881,034 A | * | 3/1999 | Mano et al. | 369/44.14 |
| 5,905,255 A | * | 5/1999 | Wakabayashi et al. | 369/44.22 |

FOREIGN PATENT DOCUMENTS

| | | | |
|---|---|---|---|
| JP | 6-162540 | * | 6/1994 |
| JP | 6-259796 | | 9/1994 |
| JP | 9-231595 | | 9/1997 |
| JP | 11-306570 | | 11/1999 |

* cited by examiner

*Primary Examiner*—William Korzuch
*Assistant Examiner*—Kim-Kwok Chu
(74) *Attorney, Agent, or Firm*—Robert E. Bushnell, Esq.

(57) ABSTRACT

An optical pickup assembly includes a base, a bobbin having an objective lens mounted thereon, the bobbin being installed at the base so as to be movable and having a pair of first side surfaces parallel to a radial direction of a disk and a pair of second side surfaces parallel to the tangential direction of a disk track, a focus coil wound around the bobbin for driving the objective lens in a focus direction, a track coil installed at the first side surfaces for driving the objective lens in a radial direction of the disk, a driving magnet installed at the base to face the first side surfaces, a tilt coil installed at the second side surfaces for driving the objective lens in response to the relative inclination between the objective lens and the disk, a first tilt magnet installed at the base such that one polarity thereof faces the tilt coil, a second tilt magnet installed at an upper portion of the first tilt magnet such that another polarity opposite to the one polarity thereof faces the tilt coil, an inclination detector for detecting the relative inclination between the objective lens and the disk, and a cover coupled to the base to protect the objective lens.

20 Claims, 4 Drawing Sheets

Fig. 1 *(Related Art)*

OPTICAL PICKUP ASSEMBLY WITH ADJUSTABLE INCLINATION

CLAIM OF PRIORITY

This application makes reference to, incorporates the same herein, and claims all benefits accruing under 35 U.S.C. § 119 from my application OPTICAL PICKUP ASSEMBLY CAPABLE OF ADJUSTING INCLINATION filed with the Korean Industrial Property Office on Jun. 9,1998 and there duly assigned Ser. No. 21324/1998.

BACKGROUND OF THE INVENTION

1. Field of the Invention

The present invention relates to an optical pickup assembly which can adjust the relative inclination between an objective lens and a disk to prevent the deterioration of recording or reproduction signals due to a warped state or inclination of the disk.

2. Description of the Related Art

In general, an optical pickup records or reproduces information while moving across a recording medium such as a disk. The optical pickup includes an objective lens which focuses light emitted from a light source and forms an optical spot on the disk. The objective lens is installed at an actuator capable of moving the objective lens in a radial and focus direction of the disk such that the optical spot can be formed on a correct position on a track of the disk.

However, when the disk is in a warped state or inclined with respect to the objective lens, the recording or reproduction of signals is deteriorated. To prevent such deterioration, an inclination adjustment apparatus for an optical pickup has been suggested In such an apparatus, an optical pickup is hinge-coupled by a support member to a rack gear member. The rack gear member is moved across a disk in response to the drive of a driving motor. An inclination adjuster for supporting the optical pickup and adjusting the inclination thereof is provided at one end of the rack gear member. A tilt detector for detecting the inclination of the disk with respect to the optical axis of an objective lens is provided on the upper surface of the optical pickup. The optical pickup includes an actuator having a focusing and tracking coil for driving the objective lens.

The inclination adjuster includes a motor and an elevating portion for moving one end of the optical pickup up and down according to the rotation of the motor so that the inclination of the optical pickup is adjusted via a hinge shaft.

The tilt detector includes a light source radiating light to the disk at a predetermined angle, first and second photodetectors installed symmetrically at either side of the light source and receiving the light reflected by the disk, and a differential amplifier outputting a signal proportional to the difference between the signals detected by the first and second photodetectors.

Thus, since the detection signals of the first and second photodetectors vary according to the degree of inclination of the disk, the inclination of the optical pickup can be adjusted by feeding back the signal output from the differential amplifier to the inclination adjuster.

However, because additional elements such as the motor are required in the above apparatus to adjust the inclination of the optical pickup, the overall size of the apparatus becomes large and the structure thereof becomes complicated. Also, because the optical pickup which is large in volume and weight is subject to the adjustment, a large driving power is needed for the motor and the speed of adjustment becomes slow. Thus, the apparatus is not suitable for high speed recording or reproduction.

SUMMARY OF THE INVENTION

To solve the above problems, it is an object of the present invention to provide an optical pickup assembly having a magnetic circuit so that the relative inclination between an objective lens and a disk can be adjusted.

Accordingly, to achieve the above object, there is provided an optical pickup assembly which includes a base, a bobbin having an objective lens mounted thereon, the bobbin being installed at the base so as to be movable and having a pair of first side surfaces parallel to a radial direction of a disk and a pair of second side surfaces parallel to the tangential direction of a disk track, a focus coil wound around the bobbin for driving the objective lens in a focus direction, a track coil installed at the first side surfaces for driving the objective lens in a radial direction of the disk, a driving magnet installed at the base to face the first side surfaces, a tilt coil installed at the second side surfaces for driving the objective lens in response to the relative inclination between the objective lens and the disk, a first tilt magnet installed at the base such that one polarity thereof faces the tilt coil, a second tilt magnet installed at an upper portion of the first tilt magnet such that another polarity opposite from the. one polarity thereof faces the tilt coil, an inclination detector for detecting the relative inclination between the objective lens and the disk, and a cover coupled to the base to protect the objective lens.

According to another aspect of the present invention, there is provided an optical pickup assembly which includes a base, a bobbin having an objective lens mounted thereon, the bobbin being installed at the base so as to be movable, a focus coil wound around the bobbin for driving the objective lens in a focus direction, a track coil installed at a side surface of the bobbin for driving the objective lens in a radial direction of the disk, a driving magnet installed at the base such that one polarity thereof faces the focus coil and the track coil, a pair of tilt coils, installed such that they are spaced a predetermined distance from at least one side surface of the bobbin where the track coil is attached, for driving the objective lens in response to the relative inclination between the objective lens and the disk, a pair of tilt magnets, installed at a lower portion of the driving magnet such that a polarity opposite to the polarity of the driving magnet faces each of the tilt coils, an inclination detector for measuring the relative inclination between the objective lens and the disk, and a cover coupled to the base to protect the objective lens.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
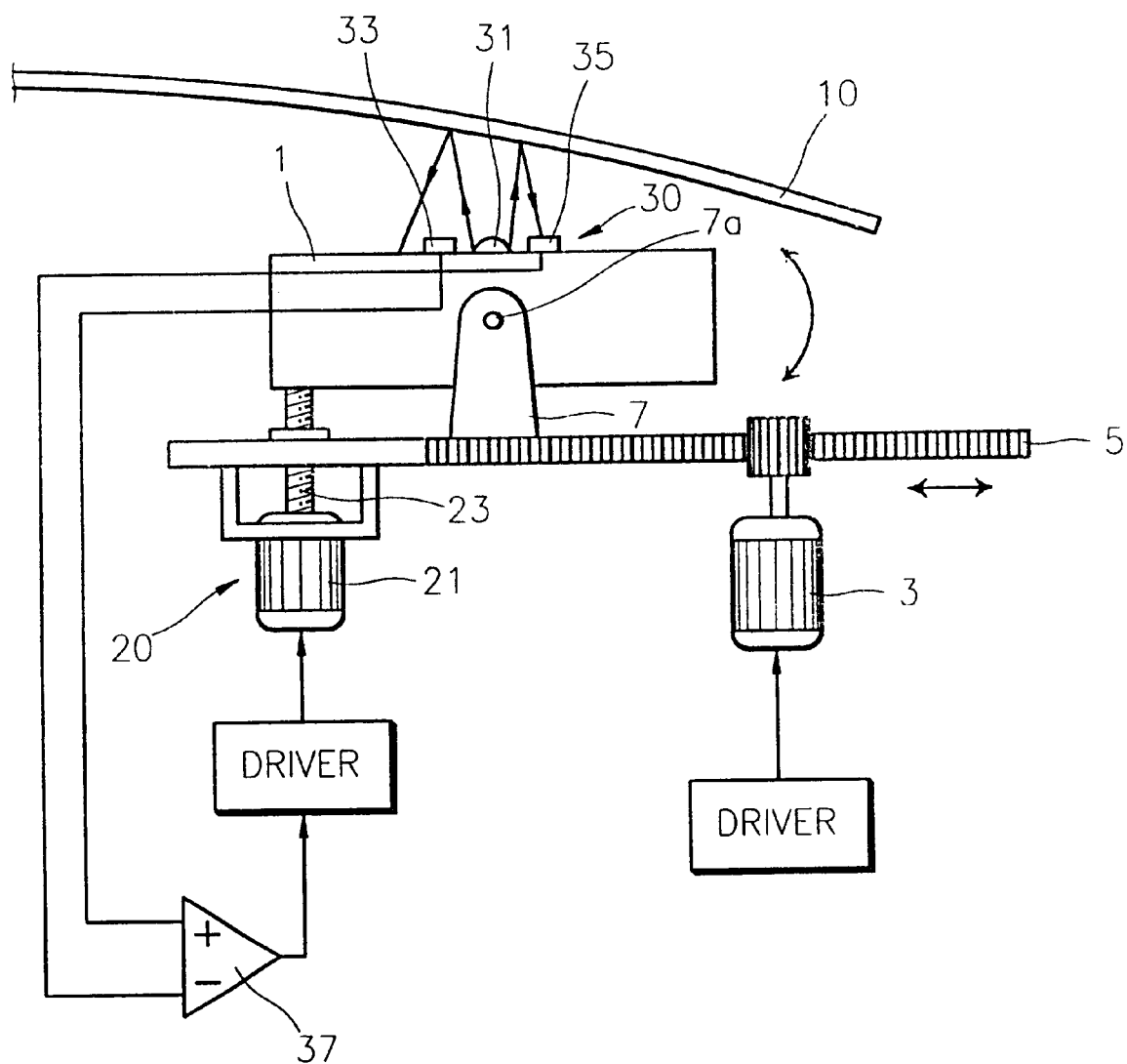
FIG. 1 is a view schematically showing an optical pickup assembly.

FIG. 1 illustrates the optical pickup assembly discussed in the Description of the Related Art above.

In FIG. 1, an optical pickup 1 is hinge-coupled by a support member 7 to a rack gear member 5 and the rack gear member 5 is moved across a disk 10 in response to the drive of a driving motor 3. An inclination adjuster 20 for supporting the optical pickup 1 and adjusting the inclination thereof is provided at one end of the rack gear member 5. A tilt detector 30 for detecting the inclination of the disk 10 with respect to the optical axis of an objective lens (not shown) is provided on the upper surface of the optical pickup 1. The optical pickup 1 includes an actuator having a focusing and tracking coil for driving the objective lens.

The inclination adjuster 20 includes a motor 21 and an elevating portion 23 for moving one end of the optical pickup 1 up and down according to the rotation of the motor 21 so that the inclination of the optical pickup 1 is adjusted via a hinge shaft 7a.

The tilt detector 30 includes a light source 31 radiating light to the disk 10 at a predetermined angle, first and second photodetectors 33 and 35 installed symmetrically at either side of the light source 31 and receiving the light reflected by the disk 10, and a differential amplifier 37 outputting a signal proportional to the difference between the signals detected by the first and second photodetectors 33 and 35.

Thus, since the detection signals of the first and second photodetectors 33 and 35 vary according to the degree of inclination of the disk 10, the inclination of the optical pickup 1 can be adjusted by feeding back the signal output from the differential amplifier 37 to the inclination adjuster 20.

Figure 2:
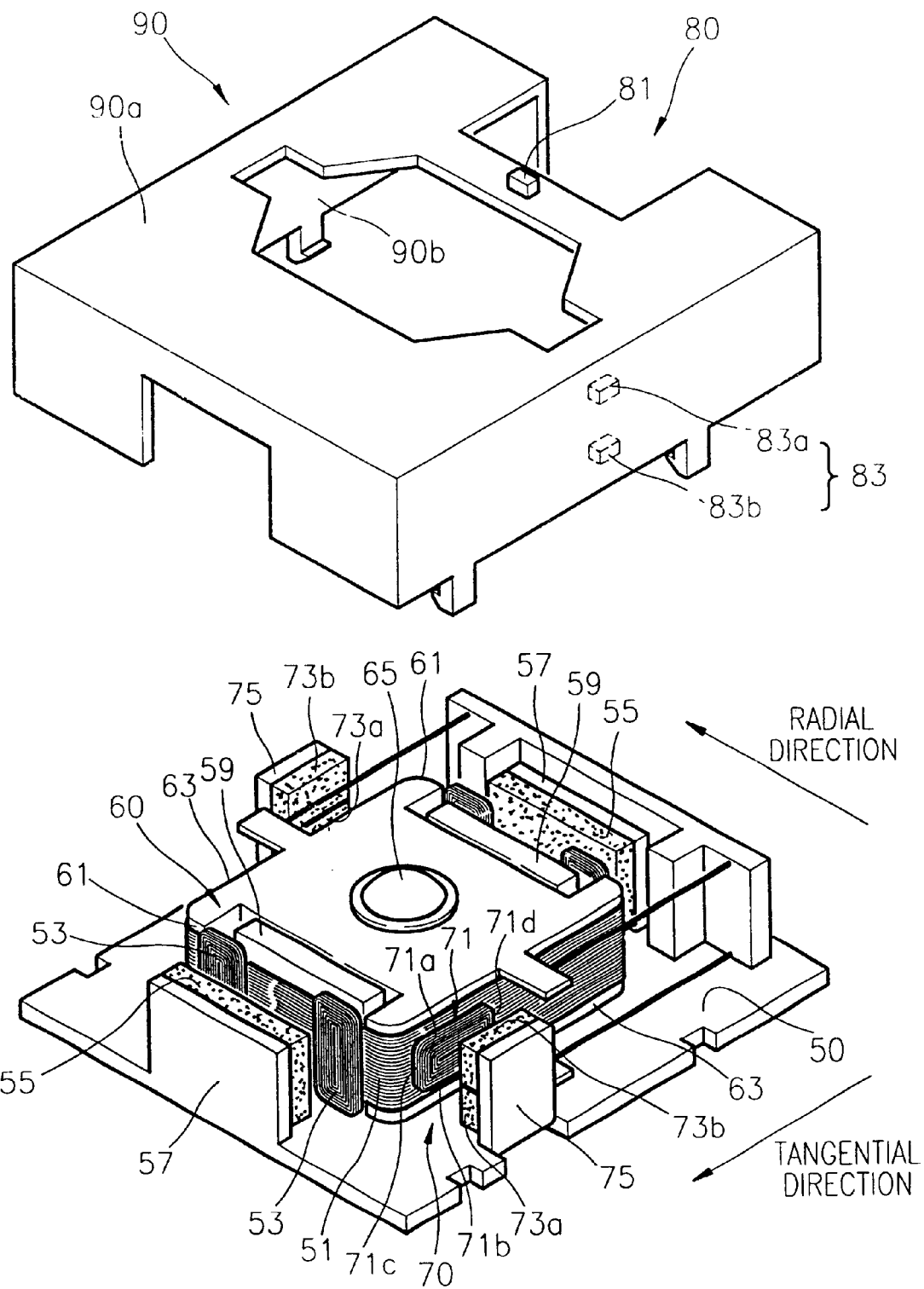
FIG. 2 is an exploded perspective view showing an optical pickup assembly according to a preferred embodiment of the present invention.

Referring to FIG. 2, an optical pickup assembly according to a preferred embodiment of the present invention includes a base 50, a bobbin 60 where an objective lens 65 is mounted, a magnetic driving portion for driving the bobbin 60 in a focus direction and a track direction, an inclination corrector 70 for correcting the relative inclination between the objective lens 65 and a disk (not shown), an inclination detector 80 for measuring the relative inclination between the objective lens 65 and the disk, and a cover 90 coupled to the base 50 to protect the objective lens 65.

The base 50, mounted on a guide rail (not shown), moves across the disk. The bobbin 60 is installed on the base 50 so as to be movable and has a pair of first side surfaces 61 approximately parallel to a radial direction of the disk and a pair of second side surfaces 63 approximately parallel to a tangential direction of a disk track.

The magnetic driving portion includes a focus coil 51 wound around the bobbin 60 for driving the objective lens 65 in the focus direction, track coils 53 attached to each of the first side surfaces 61 for driving the objective lens 65 in a radial direction of the disk, and driving magnets 55 installed at the base 50 to correspond to the first side surfaces 61. The driving magnets 55 are fixed to an outer yoke 57 coupled to the base 50, and an inner yoke 59 is fixed to the base 50 and is disposed between the focus coil 51 and the bobbin 60.

When current corresponding to a focus and track error signal is applied to the focus coil 51 and the track coils 53, the bobbin 60 where the objective lens 65 is mounted is moved by the interaction of a magnetic field generated by the current and a magnetic field of the driving magnets 55 in the radial direction and the focus direction.

The inclination corrector 70 includes at least one tilt coil 71, and first and second tilt magnets 73a and 73b installed at the base 50 to face the tilt coil 71.

The tilt coil 71 is installed at the second side surfaces 63 of the bobbin 60 and drives the objective lens 65 corresponding to the relative inclination between the objective lens 65 and the disk, particularly the inclination in the radial direction of the disk. The tilt coil 71 is installed to be symmetrical with respect to the objective lens 65 as shown in FIG. 2. Alternatively, the tilt coil 71 can be installed at only one of the second side surfaces 63.

The tilt coil 71 is formed to be rectangular, and to have upper and lower portions 71a and 71b approximately parallel to a tangential direction of the disk track, and side portions 71c and 71d approximately parallel to the optical axis of the objective lens 65.

The first and second tilt magnets 73a and 73b are installed at a yoke 75 such that a different magnetic pole of each of the first and second tilt magnets 73a and 73b can face the tilt coil 71. For example, the N pole of the first tilt magnet 73a and the S pole of the second tilt magnet 73b face the tilt coil 71. Here, the boundary line between the first and second tilt magnets 73a and 73b is disposed in such a position as to cut across the side portions 71c and 71d of the tilt coil 71, as shown in FIG. 2.

When current is applied to the tilt coil 71 of the inclination corrector 70, the currents of the upper and lower portions 71a and 71b of the tilt coil 71 flow in directions opposite to each other. Accordingly, since the upper and lower portions 71a and 71b are located in the magnetic fields of different polarities of the first and second tilt magnets 73a and 73b, respectively, the upper and lower portions 71a and 71b of the tilt coil 71 simultaneously experience an upward or downward force. Thus, the inclination of the objective lens 65 can be adjusted by controlling the direction and magnitude of the current applied to the tilt coil 71. Here, the inclination of the objective lens 65 in the radial direction of the disk can be adjusted by applying current to the tilt coils 71 installed at each of the second side surfaces 63 such that forces can act in directions different from one another.

Here, the directions of the currents flowing in the side portions 71c and 71d of the tilt coil 71 are opposite to each other, and forces experienced by the side portions 71c and 71d are offset.

Figure 3:
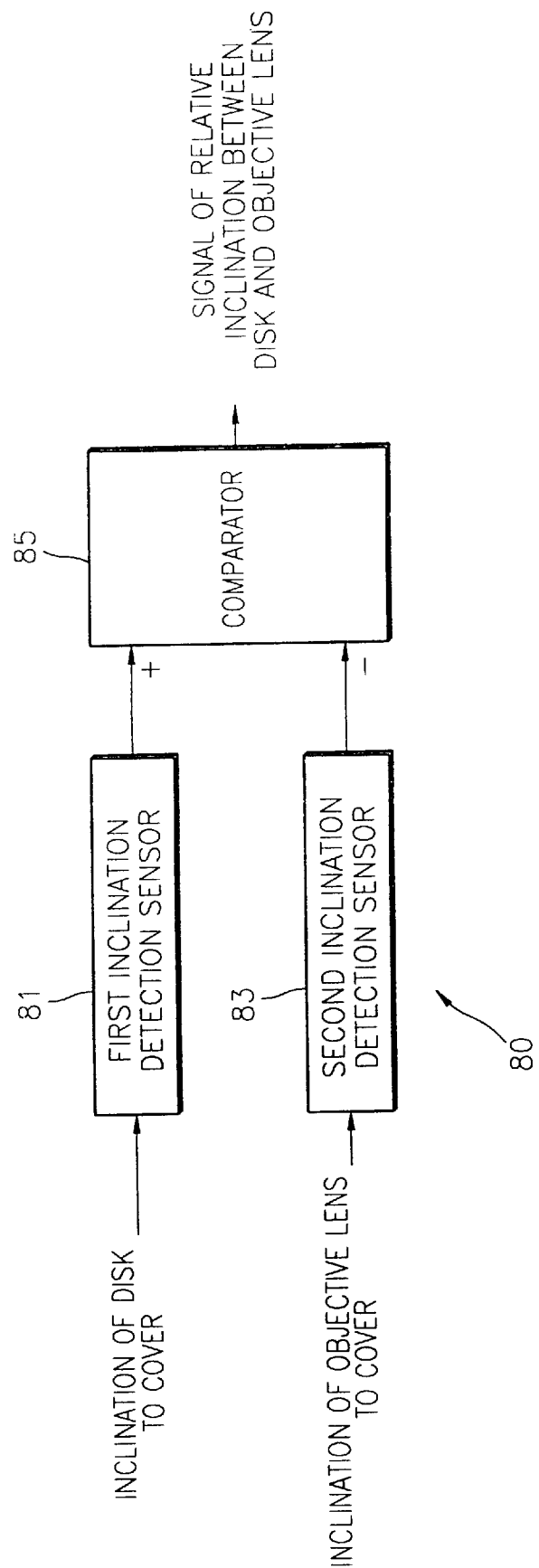
FIG. 3 is a block diagram showing the inclination detection portion of FIG. 2.

As shown in FIGS. 2 and 3, the inclination detector 80 includes a first inclination detection sensor 81 installed on the upper surface 90a of the cover 90, i.e., on a surface facing the disk, a second inclination detection sensor 83 installed on the inside surface 90b of the cover 90, and a comparator 85 for comparing detection signals of the first and second inclination detection sensors 81 and 83 and outputting the signal of the relative inclination of the objective lens 65 to the disk.

The first inclination detection sensor 81 measures the relative inclination between the cover 90 and the disk. The second inclination detection sensor 83 is installed to face at least one of the side surfaces of the bobbin 60 and measures the relative inclination between the cover 90 and the objective lens 65 so that the inclination of the objective lens 65 in the radial direction of the disk is detected. To achieve more accurate measurement of the inclination, as shown in FIG. 2, the second inclination detection sensor 83 may be comprised of an inclination detection sensor 83a installed to have the same height as the objective lens 65 and another inclination detection sensor 83b installed to face the side surface of the bobbin 60.

The first and second inclination detection sensors 81 and 83 are preferably sensors capable of measuring the change in distance from the sensor to an object.

The first inclination detection sensor 81 detects the relative inclination between the cover 90 and the disk by measuring the change in distance between the cover 90 and the disk according to the inclination of the disk with respect to the cover 90. The detection signal of the first inclination detection sensor 81 is input to the comparator 85.

Also, the second inclination detection sensor 83 detects the relative inclination between the cover 90 and the objective lens 65 by measuring the change in distance between the cover 90 and the objective lens 65 according to the inclination of the bobbin 60, i.e., the objective lens 65, with respect to the cover 90. A detection signal of the second inclination detection sensor 83 is input to the comparator 85.

When the second inclination detection sensor 83 is comprised of the above-described inclination detection sensors 83a and 83b, the detection signals of the inclination detection sensor 83a measuring the relative inclination between the cover 90 and the objective lens 65 and the other inclination detection sensor 83b measuring the relative inclination between the cover 90 and the bobbin 60 are compared in a differential portion (not shown) and input to the comparator 85.

The comparator 85 compares the detection signals input from the first and second inclination detection sensors 81 and 83, and outputs a signal indicative of the relative inclination between the disk and the objective lens 90. Thus, the inclination detection portion 80 according to the present invention detects the relative inclination between the disk and the objective lens with respect to the cover 90, and the detection signal is fed back to a tilt coil driving portion (not shown) to use for adjusting the inclination of the objective lens 65.

Figure 4:
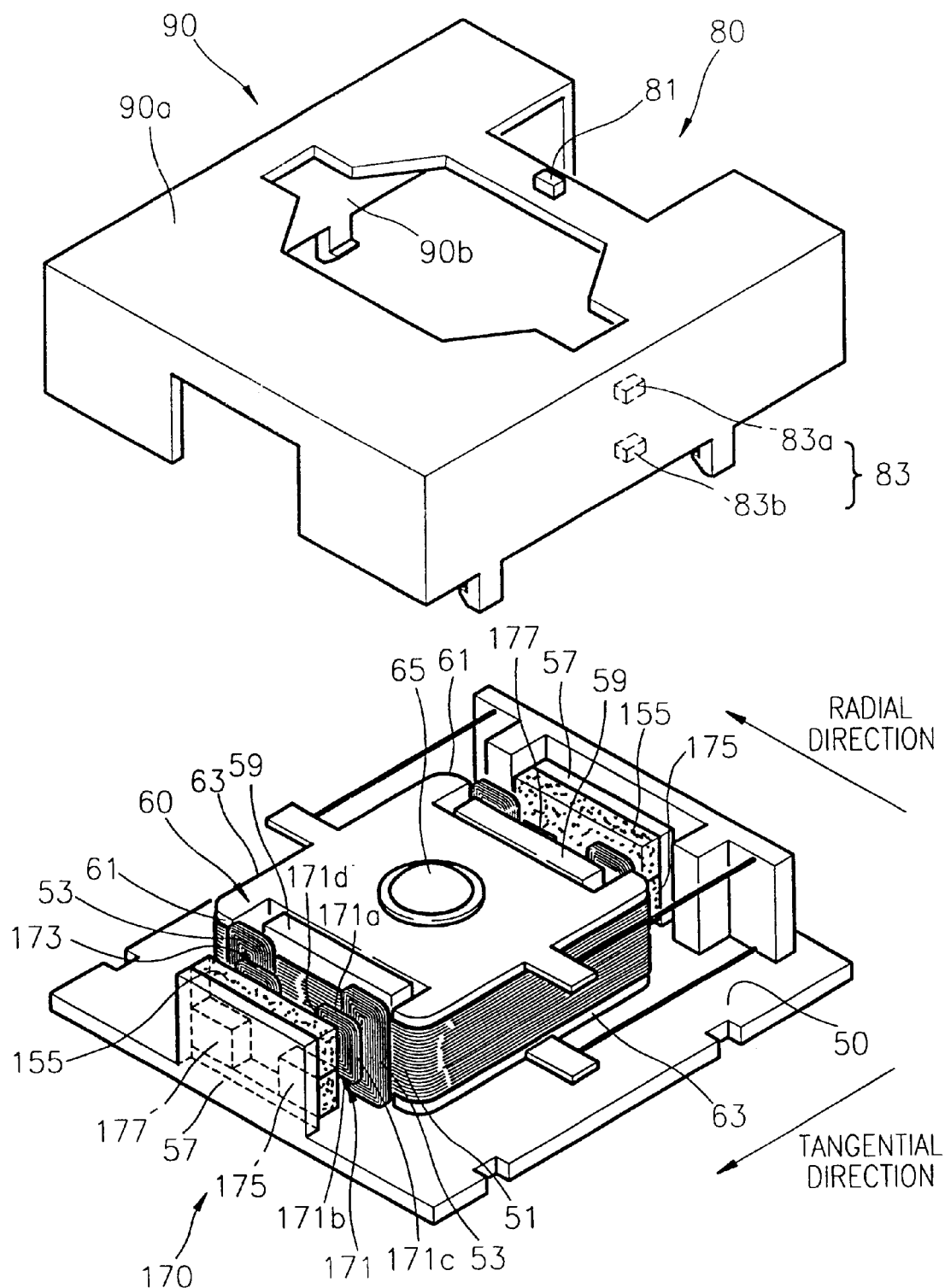
FIG. 4 is an exploded perspective view showing an optical pickup assembly according to another preferred embodiment of the present invention.

FIG. 4 shows an optical pickup assembly capable of adjusting inclination according to another preferred embodiment of the present invention. Here, reference numerals the same as those in FIG. 2 indicate the same members.

In the present embodiment, an inclination corrector 170 is installed at the first side surfaces of the bobbin 60. A driving magnet 155 is installed at the base 50 such that one polarity, e.g., the S pole, of the driving magnet 155 can face the focus coil 51 and the track coil 53. The driving magnet 155 is T-shaped so that tilt magnets 175 and 177 are disposed at both sides of a lower portion of the driving magnet 155.

The inclination corrector 170 includes first and second tilt coils 171 and 173 installed such that they are spaced a predetermined distance from each of the first side surfaces 61 of the bobbin 60 where the track coil 53 is installed, and first and second tilt magnets 175 and 177 installed at both sides of the lower portion of the driving magnet 155 such that a polarity opposite to the driving magnet 155, e.g., the N pole, can face the first and second tilt coils 171 and 173. Alternatively, the first and second tilt coils 171 and 173 are installed at only one of the first side surfaces 61 and the first and second tilt magnets 175 and 177, corresponding to the first and second tilt coils 171 and 173, are installed at only one driving magnet 155.

The first and second tilt coils 171 and 173 have upper and lower portions 171a and 171b approximately parallel to the radial direction of the disk, and side portions 171c and 171d approximately parallel to the optical axis of the objective lens 65. Here, the boundary line between the first and second tilt magnets 175 and 177 and the driving magnet 155 is disposed in such a portion as to cut across the side portions 171c and 171d of the respective tilt coils 171 and 173, as shown in FIG. 4.

When current is applied to the first tilt coil 171, the currents of the upper and lower portions 171a and 171b of the first tilt coil 171 flow in directions opposite to each other. Accordingly, since the upper and lower portions 171a and 171b are located in magnetic fields of different polarities of the first tilt magnet 175 and the driving magnet 155, respectively, the upper and lower portions 171a and 171b of the first tilt coil 171 simultaneously experience an upward or downward force. Likewise, the second tilt coil 173 interacts with the second tilt magnet 177 and the driving magnet 155. Thus, the inclination of the objective lens 65 in the radial direction of the disk can be adjusted by controlling the direction of the current such that the first and second tilt coils 171 and 173 experience forces in directions different from each other and concurrently controlling the magnitude of the current.

As described above, in the optical pickup assembly according to the present invention, only the objective lens is driven by employing a magnetic circuit comprised of a tilt coil and a tilt magnet so that the relative inclination between the objective lens and the disk can be adjusted. Thus, since speed in responding to the driving is fast, the assembly according to the present invention is suitable for a high speed optical recording/reproducing apparatus. Further, since the inclination of the objective lens can be adjusted with much less electric power than the electric power needed in driving the motor of the conventional inclination adjustment apparatus, the present assembly is suitable for a portable optical recording/reproducing apparatus.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical pickup assembly, comprising:

a base;

a bobbin having an objective lens mounted thereon, said bobbin being installed at said base so as to be movable, and having a pair of first side surfaces parallel to a radial direction of a disk and a pair of second side surfaces parallel to a tangential direction of a disk track;

a focus coil wound around said bobbin, and covering said first side surfaces and said second side surfaces, for driving said objective lens in a focus direction;

at least one track coil installed at each of said first side surfaces for driving said objective lens in the radial direction of said disk;

a driving magnet installed at said base to face said first side surfaces;

a tilt coil installed at one of said second side surfaces for driving said objective lens in response to a relative inclination between said objective lens and said disk;

a first tilt magnet installed at said base such that one polarity thereof faces said tilt coil;

a second tilt magnet installed at an upper portion of said first tilt magnet such that another polarity, opposite from the one polarity, thereof faces said tilt coil;

an inclination detector for detecting the relative inclination between said objective lens and said disk; and a cover coupled to said base to protect said objective lens.

2. The optical pickup assembly as claimed in claim 1, further comprising an additional tilt coil installed on another of said second side surfaces so that said tilt coils are symmetrical with respect to said objective lens.

3. The optical pickup assembly as claimed in claim 1, said inclination detector comprising:
   a first inclination detection sensor, installed on a surface of said cover facing said disk, for measuring a relative inclination between said cover and said disk;
   a second inclination detection sensor, installed on an inside surface of said cover and having a height the same as a height of said objective lens, for measuring a relative inclination between said cover and said objective lens; and
   a comparison unit for comparing detection signals from said first and second inclination detection sensors, and for detecting the relative inclination between said objective lens and said disk.

4. The optical pickup assembly as claimed in claim 3, said inclination detector further comprising a third inclination detection sensor installed so as to face said bobbin for measuring a relative inclination between the bobbin and the cover.

5. The optical pickup assembly as claimed in claim 1, said inclination detector comprising:
   a first inclination detection sensor, installed on a surface of said cover facing said disk, for measuring a relative inclination between said cover and said disk;
   a second inclination detection sensor, installed on an inside surface of said cover and having a height the same as a height of said objective lens, and facing an outer circumferential surface of said bobbin, for measuring a relative inclination between said cover and said objective lens; and
   a comparison unit for comparing detection signals from said first and second inclination detection sensors, and for detecting the relative inclination between said objective lens and said disk.

6. The optical pickup assembly as claimed in claim 5, said inclination detector further comprising a third inclination detection sensor installed so as to face said bobbin for measuring a relative inclination between the bobbin and the cover.

7. The optical pickup assembly as claimed in claim 1, said inclination detector comprising:
   a first inclination detection sensor, installed on a surface of said cover facing said disk, for measuring a relative inclination between said cover and said disk;
   a second inclination detection sensor, installed on an inside surface of said cover so as to face an outer circumferential surface of said bobbin, for measuring a relative inclination between said cover and said objective lens; and
   a comparison unit for comparing detection signals from said first and second inclination detection sensors, and for detecting the relative inclination between said objective lens and said disk.

8. The optical pickup assembly as claimed in claim 7, said inclination detector further comprising a third inclination detection sensor installed so as to face said bobbin for measuring a relative inclination between the bobbin and the cover.

9. The optical pickup assembly as claimed in claim 1, wherein said at least one track coil comprises two track coils installed at said each of said first side surfaces.

10. The optical pickup assembly as claimed in claim 1, further comprising two yokes, each being installed on a respective one of said second side surfaces and disposed between said focus coil and said bobbin.

11. The optical pickup assembly as claimed in claim 1, wherein an additional tilt coil is installed on another of said second side surfaces, and wherein an additional first tilt magnet and an additional second tilt magnet are installed so as to face said additional tilt coil.

12. An optical pickup assembly, comprising:
    a base;
    a bobbin having an objective lens mounted thereon, said bobbin being installed at said base so as to be movable;
    a focus coil wound around said bobbin for driving said objective lens in a focus direction;
    at least one track coil installed at a side surface of said bobbin for driving said objective lens in a radial direction of a disk;
    a driving magnet installed at said base such that one polarity thereof faces said focus coil and said track coil;
    a pair of tilt coils installed such that said tilt coils are spaced a predetermined distance from said side surface of said bobbin where said track coil is attached, for driving said objective lens in response to a relative inclination between said objective lens and said disk;
    a pair of tilt magnets, installed at a lower portion of said driving magnet such that a polarity thereof, opposite to the one polarity of said driving magnet, faces each of said tilt coils;
    an inclination detector for measuring the relative inclination between said objective lens and said disk; and
    a cover coupled to said base to protect said objective lens;
    said inclination detector comprising:
      a first inclination detection sensor, installed on a surface of said cover facing said disk, for measuring a relative inclination between said cover and said disk;
      a second inclination detection sensor, installed on an inside surface of said cover and having a height the same as a height of said objective lens, for measuring a relative inclination between said cover and said objective lens; and
      a comparison unit for comparing detection signals from said first and second inclination detection sensors, and for detecting the relative inclination between said objective lens and said disk.

13. The optical pickup assembly as claimed in claim 12, said second inclination detection sensor facing an outer circumferential surface of said bobbin.

14. The optical pickup assembly as claimed in claim 13, said inclination detector further comprising a third inclination detection sensor installed so as to face said bobbin for measuring a relative inclination between the bobbin and the cover.

15. The optical pickup assembly as claimed in claim 12, wherein said at least one track coil comprises two track coils installed at said side surface.

16. The optical pickup assembly as claimed in claim 12, further comprising a yoke disposed between said focus coil and said bobbin.

17. The optical pickup assembly as claimed in claim 12, further comprising an additional pair of tilt coils installed at and spaced from another side surface of said bobbin opposite to said side surface, and an additional pair of tilt magnets installed facing said additional pair of tilt coils.

18. The optical pickup assembly as claimed in claim 12, wherein said tilt magnets of said pair of tilt magnets are disposed next to each other.

19. An optical pickup assembly, comprising:

a base;

a bobbin having an objective lens mounted thereon, said bobbin being installed at said base so as to be movable;

a focus coil wound around said bobbin for driving said objective lens in a focus direction;

at least one track coil installed at a side surface of said bobbin for driving said objective lens in a radial direction of a disk;

a driving magnet installed at said base such that one polarity thereof faces said focus coil and said track coil;

a pair of tilt coils installed such that said tilt coils are spaced a predetermined distance from said side surface of said bobbin where said track coil is attached, for driving said objective lens in response to a relative inclination between said objective lens and said disk;

a pair of tilt magnets, installed at a lower portion of said driving magnet such that a polarity thereof, opposite to the one polarity of said driving magnet, faces each of said tilt coils;

an inclination detector for measuring the relative inclination between said objective lens and said disk; and a cover coupled to said base to protect said objective lens;

said inclination detector comprising:

a first inclination detection sensor, installed on a surface of said cover facing said disk, for measuring a relative inclination between said cover and said disk;

a second inclination detection sensor, installed on an inside surface of said cover so as to face an outer circumferential surface of said bobbin, for measuring a relative inclination between said cover and said objective lens; and a comparison unit for comparing detection signals from said first and second inclination detection sensors, and for detecting the relative inclination between said objective lens and said disk.

20. The optical pickup assembly as claimed in claim 19, said inclination detector further comprising a third inclination detection sensor installed so as to face said bobbin for measuring a relative inclination between the bobbin and the cover.

* * * * *